Jan. 17, 1956  S. KAPLANOWSKI  2,731,124
COIN-OPERATED METER FOR ELECTRICAL ENERGY
Filed Oct. 30, 1950  2 Sheets-Sheet 1

Inventor
Stanley Kaplanowski
By
Glenn B. Moore
Attorney

Jan. 17, 1956     S. KAPLANOWSKI     2,731,124
COIN-OPERATED METER FOR ELECTRICAL ENERGY
Filed Oct. 30, 1950     2 Sheets-Sheet 2

Inventor
Stanley Kaplanowski
By
Glenn B. Morse
Attorney

United States Patent Office 2,731,124
Patented Jan. 17, 1956

2,731,124

COIN-OPERATED METER FOR ELECTRICAL ENERGY

Stanley Kaplanowski, Grand Rapids, Mich.

Application October 30, 1950, Serial No. 192,892

2 Claims. (Cl. 194—6)

The present invention provides a coin-operated meter for electrical energy. The word "meter," in the sense used herein, includes the measurement in terms of time and also in terms of quantity. In other words, it is contemplated that the device will be used to provide either a given quantity of electrical current for the insertion of a coin of given denomination, or provide current for a given length of time upon the insertion of such a coin. The device may be used either in the sale of electrical energy as such, or may be used as an instrument in the collection of time payments upon a machine that utilizes electricity. The attachment of such a meter to a washing machine, refrigerator, or other appliance will force the customer to make his regular payments through the necessity of keeping the machine supplied with coins in order to make it function.

When it is desired to meter electric current on a time basis, an electric clock mechanism is activated by a system controlled by coins and including solenoids and solenoid-operated switches. These components cooperate in such a manner that the insertion of a coin starts the running of the clock, the clock being adapted to shut off the load current after a predetermined lapse of time. When it is desired to provide a given quantity of electrical energy (such as may be measured in watthours), the coin system operates in conjunction with a conventional watthour meter. One of the recording shafts of the meter is provided with an actuator adapted to cause the load current to be cut off after the predetermined quantity of energy has been supplied.

In addition to features of construction that facilitate the manufacture and installation of the entire unit, the present invention provides a metering device in which the inserted coins are used to control suitable contacts that do not carry a substantial amount of current. Several metering units are presently available that require the coin (or the consumer who inserts it) to directly actuate a considerable amount of mechanism, and this characteristic has a tendency to cause a great deal of uncertainty in operation. In the present invention, the coin-operated contacts are used to energize the remainder of the system, and means are provided for ejecting the coin after it has performed its activating function. It is also noteworthy that the present invention does not require the manual operation of any handle or other related equipment. The obvious advantage of this feature is that it renders it practicably impossible for a user to cause abnormal operation of the metering due to improper operation.

The several features of the present invention will be analyzed in detail by a discussion of the particular embodiments illustrated in the accompanying drawings. In these drawings.

Figure 1:
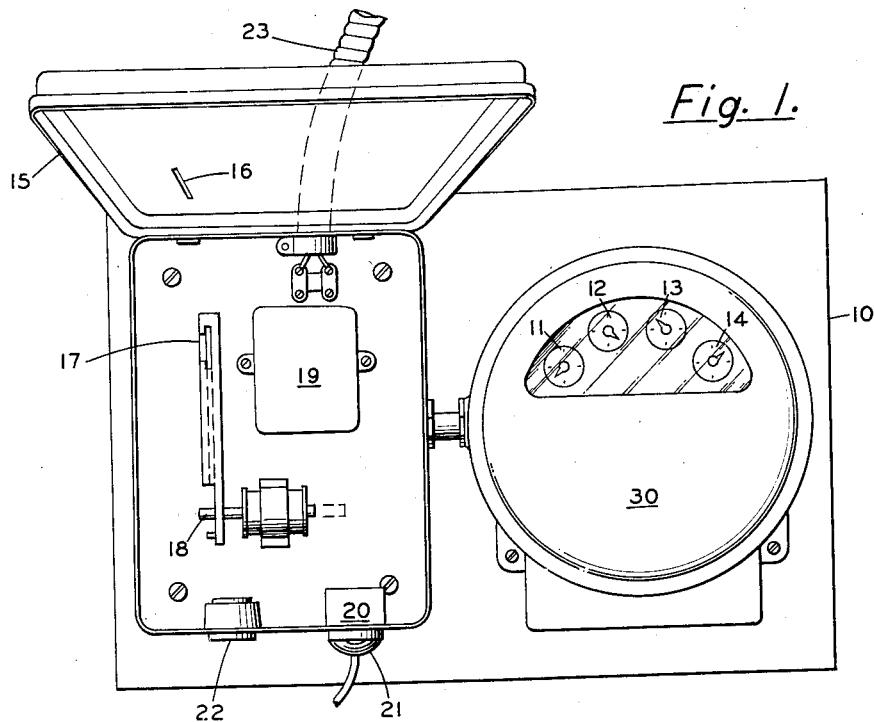
Figure 1 is a perspective view taken from above of an asembled metering unit shown with the cover open.
Figure 2:
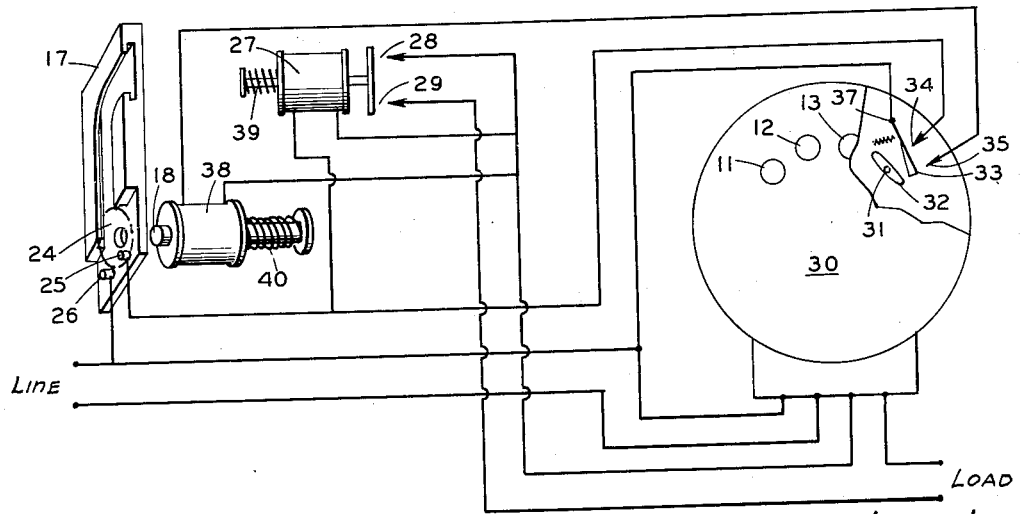
Figure 2 is a circuit diagram showing the operation of the device illustrated in Figure 1.
Figure 3:
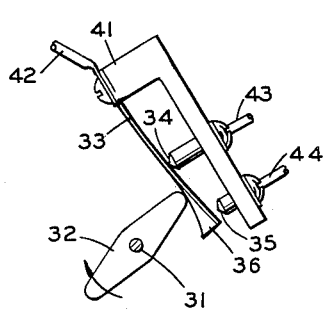
Figure 4:
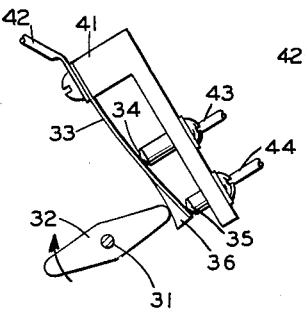
Figure 5:
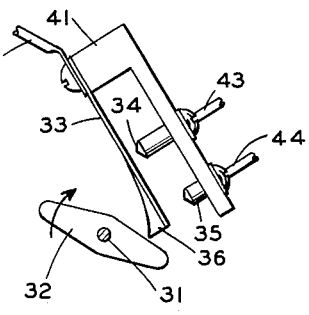

Figures 3 through 5, inclusive, show various aspects of the operation of the meter-controlled contacts utilized in the instrument shown in Figures 1 and 2.

Figure 6:
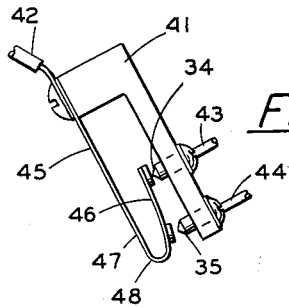

Figure 6 shows a modified form of the meter-operated contact system.

Figure 7:
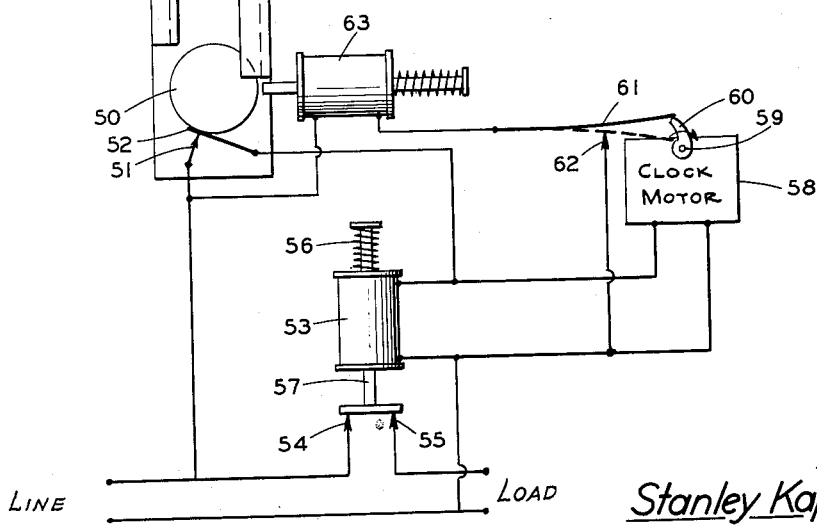

Figure 7 shows a modified form of the present invention in which a clock mechanism is used in place of watthour meter and in which the operation of the coin-circuit is somewhat different from the arrangements indicated in Figure 2.

Referring to Figure 1, the metering instrument is housed within a case 10. The recording dials 11, 12, 13, and 14, are visible on top of the instrument. Those dials are conventional, and are associated with the conventional watthour meter mechanism.

At the left-hand portion of the device as shown in Figure 1, a cover 15 (shown in elevated position) is provided with a coin slot 16 registering with the coin chute 17 when the cover is in closed position. Suitable contacts are arranged in conjunction with the coin chute 17 and the solenoid and plunger unit 18 is positioned to eject coins from active position with respect to these contacts. A load switch operated by a solenoid is indicated at 19, and a suitable receptacle at 20 in which an appliance or some other load can be plugged in as is indicated at 21. A fuse unit may be provided as indicated at 22, and a cable 23 is shown for connecting the instrument to the main line or source of electrical energy.

Referring to Figure 2, the coin chute 17 is adapted to receive a coin of given denomination. Such a coin is indicated at 24 in dotted lines. In the modification shown in Figure 2, the coin indicated at 24 bridges the contacts 25 and 26 and energizes the solenoid 27. This solenoid controls the load contacts 28 and 29, and supplies electrical energy to the load through the meter unit indicated generally at 30. The meter shaft 31 corresponding to the indicating dial 14 shown in Figure 1 is provided with a cam actuator 32. When the load contacts 28 and 29 are bridged causing a supply of load current to flow through the meter, the rotation of the shaft 31 causes the cam actuator 32 to revolve. Rotation continues until the end of the actuator cooperates with the contacting arm 33. As rotation of the shaft continues, the current-conducting arm 33 is first forced into engagement with the contact 34, and then into engagement with the contact 35. Preferably, a ramp-shaped surface 36 is associated with the arm 33, and the relative positions of the contacts 34 and 35 and the fixed end 37 of the arm cause the sequence contacting arrangement noted above.

As the contact 34 is engaged by the arm 33, another source of electrical energy is established for maintaining the solenoid 27 energized to hold the contacts 28 and 29 in closed circuit. The engagement of the contact 35 by the arm 33 energizes the ejecting solenoid 38, and causes the plunger 18 to knock the coin from position in which it closes the circuit between the contacts 25 and 26.

Continued rotation of the shaft 31 first releases the arm 33 from the contact 35. The load contacts 28 and 29 are still bridged due to the control of the solenoid 27 by the contact 34. Continued rotation of the shaft from this point eventually breaks the engagement between the contact 34 and the arm 33, and de-energizes the solenoid 27. The spring 39 of the solenoid 27 opens the circuit between the contacts 28 and 29 and interrupts the load current. The solenoid 38 is likewise provided with a spring 40 causing the plunger 18 to return to inactive position after the solenoid is de-energized.

It will be noted that the solenoid 38 is energized as long as the contact 35 is closed. While the plunger 18 is in extended position after having ejected a coin, further passage of coins downwardly in the chute 17 is prevented. As the contact 35 is disengaged from the arm 33, the retraction of the plunger 18 permits other coins that may have been inserted in the chute to move downwardly. The action of contact 34 holds the load solenoid 27 in closed position and permits succeeding coins to take over the control of the device without causing a break in the supply of load current. The circuit involving the contact 34 also maintains the meter 30 energized so that the rotation of the shaft 31 will continue after the ejection of the coil long enough for the cam 32 to complete its cycle of operation.

Referring to Figures 3, 4, and 5, an enlarged view is shown of the contact system indicated in Figure 2. A non-conductive base member 41 is secured to the meter 30, and provides mounting for the conducting arm 33 and the contacts 34 and 35. A suitable lead 42 supplies electrical energy to the arm 33, and similarly leads 43 and 44 are associated with the contacts 34 and 35.

Figure 6 illustrates a modified form of the switch mechanism serving the same general purpose as the arrangement shown in Figures 3, 4, and 5. Leads similar to 43 and 44 may be utilized, as well as the back member 41 and contacts 34 and 35. The contacting arm 45, however, is formed differently from the arrangements indicated in the previous figures. A reversed portion 46 is formed in the arm 45, and provides a spring action and also a means for insuring the sequence contacting characteristic noted in conjunction with the previous arrangement. Pressure at the approximate point indicated at 47 will first cause deflection of the arm 45 near its fixed point of mounting and will consequently cause engagement with the contact 34. Continued pressure at 47 will cause flexure of the arm 45 near the outer bent end 48 sufficient to permit engagement with the contact 35. During the flexure at the end 48, a certain amount of wiping action will take place at the contact 34. It is well known that any such wiping action will serve to maintain the contacts in a clean and uniform condition, and it is preferred that the relative position of the switch components shown in Figure 6 and the cam actuator 32 be such as to generate a substantial amount of such wiping action.

Referring to Figure 7, a modified form of the present invention is shown. A coin chute 49 is adapted to receive a coin as indicated at 50 and conduct it to a point where it will cause the engagement of the contact 51 by the flexible current-conducting arm 52. Such contact supplies energy to the solenoid 53 controlling the load contacts 54 and 55. A spring 56 causes the plunger 57 to open the circuit between the contacts 54 and 55 when the solenoid 53 is no longer energized.

The contacts established at 51 also supplies energy to the clock motor 58 having the driving shaft 59 carrying the cam 60. During the time that the contact is completed at 51, both the solenoid 53 and the clock motor 58 are energized. After the clock motor has revolved to a point where the cam 60 has caused the flexible conducting arm 61 to be deflected upwardly, and has reached a point at the end of this conducting arm, further rotation causes the cam 60 to pass from under the conducting arm 61 and permit it to snap downwardly. Through its inertia, momentary contact is established at the point 62. Such momentary contact energizes the ejection solenoid 63 and knocks the coin 50 from position in which it cooperates with the arm 52. In order to prolong the duration of the momentary contact at 62, the arm 61 may be provided with added inertia, and the contact 62 may be formed as a yieldable element if desired. The ejection of the coin 50 from active position breaks the supply of energy to the load solenoid 53 and opens the contacts 54 and 55. A succeeding coin placed in the chute 49 will again activate the device.

The particular embodiments illustrated in the accompanying drawings and discussed herein are for illustrative purposes only and are not to be considered as a limitation upon the scope of the appended claims. In these claims it is the intent of the inventor to claim the entire invention to which he is entitled in view of the prior art.

I claim:

1. A circuit controller, comprising: switch means; first solenoid means, adapted to actuate said switch means; coin-receiving means including a chute; first contact means, associated with said coin-receiving means and adapted for actuation by a coin that has traversed said chute; second solenoid means; coin-ejecting means positioned by said second solenoid means and adapted to bar the passage of succeeding coins when in coin-ejecting position; first circuit means, associating said first solenoid means and said first contact means; metering means connected in series relationship with said switch means; cam means driven by said metering means; second contact means, operated by said cam means; second circuit means, associating said second contact means and second solenoid means whereby the completion of the metering action causes said second solenoid means to operate said coin-ejecting means and remove a coin from actuating position; third contact means, operated by said cam means before, during, and after, said second contact means, said second and third contact means including flexible conducting arm means disposed to be deflected by said cam means and thereby establish the contact sequence of said second and third contact means at succeeding angular positions of said cam means; and third circuit means associating said third contact means in shunt relationship with said first contact means.

2. A circuit controller, comprising: switch means; first solenoid means, adapted to actuate said switch means; coin-receiving means including a chute; first contact means, associated with said coin-receiving means and adapted for actuation by a coin that has traversed said chute; second solenoid means; coin-ejecting means positioned by said second solenoid means and adapted to bar the passage of succeeding coins when in coin-ejecting position; first circuit means, associating said first solenoid means and said first contact means; metering means connected in series relationship with said switch means; second contact means, operated by said metering means; second circuit means, associating said second contact means and second solenoid means whereby the completion of the metering action causes said second solenoid means to operate said coin-ejecting means and remove a coin from actuating position; third contact means operated by said metering means before, during, and after said second contact means, said second and third contact means including a flexible conducting arm adapted to flex to permit sequential contact at points thereon; and third circuit means associating said third contact means in shunt relationship with said first contact means.

References Cited in the file of this patent

UNITED STATES PATENTS

| | | |
|---|---|---|
| 1,084,305 | Watson | Jan. 13, 1914 |
| 2,241,540 | Casey | May 13, 1941 |
| 2,252,825 | Witherell | Aug. 19, 1941 |
| 2,282,269 | Tone | May 5, 1942 |
| 2,413,700 | Farrell | Jan. 7, 1947 |